United States Patent [19]

Novak

[11] Patent Number: 4,920,631
[45] Date of Patent: May 1, 1990

[54] TOOL RACK FOR MACHINE TOOLS

[75] Inventor: Peter Novak, Tägerwilen, Switzerland

[73] Assignee: Starrfraschmachinen, AG., Rorschacjerberg, Switzerland

[21] Appl. No.: 251,899

[22] Filed: Sep. 30, 1988

[30] Foreign Application Priority Data

Oct. 8, 1987 [CH] Switzerland .................. 3941/87

[51] Int. Cl.$^5$ ............................. B23Q 3/157
[52] U.S. Cl. ........................ 29/568; 211/1.5
[58] Field of Search ............... 29/568, 26 A; 211/1.5

[56] References Cited

U.S. PATENT DOCUMENTS

| | | | |
|---|---|---|---|
| 3,613,225 | 10/1971 | Sato et al. | 29/568 |
| 3,762,568 | 10/1973 | Dimitrov et al. | 29/568 X |
| 3,780,423 | 12/1973 | Lilienthal et al. | 29/568 |
| 4,156,962 | 6/1979 | Haller | 29/568 |

FOREIGN PATENT DOCUMENTS

| | | |
|---|---|---|
| 144912 | 11/1986 | European Pat. Off. . |
| 266646 | 10/1987 | European Pat. Off. . |
| 1932369 | 10/1969 | Fed. Rep. of Germany . |
| 1556626 | 2/1970 | Fed. Rep. of Germany . |
| 2105259 | 4/1972 | France . |
| 236041 | 5/1986 | German Democratic Rep. . |
| 62-102938 | 5/1987 | Japan . |
| 2157996 | 11/1985 | United Kingdom . |

Primary Examiner—Z. R. Bilinsky
Attorney, Agent, or Firm—Helfgott & Karas

[57] ABSTRACT

A tool rack includes a rotor mounted in a rotary manner on a column and carrying on its circumference tool magazines in a tight, uninterrupted arrangement over the entire circumference thereof, so that there is no possibility of access for a tool interchanger to the individual tools. A displacement unit with displacement arms positioned above and below the rotor is used for the access to a tool. The displacement arms have magazine grippers which grip a desired, displayed magazine, and advance it over the length of the tools of the adjacent tool holders. By means of the tool interchanger it is now possible to grip the desired tool and bring it to a use point. The rotor thus can be provided with a maximum number of tools, but still permits a very rapid tool exchange, which is particularly advantageous in the case of single-spindle working machines.

11 Claims, 4 Drawing Sheets

TOOL RACK FOR MACHINE TOOLS

BACKGROUND OF THE INVENTION

The invention relates to a tool rack or storage for machine tools with numerical control for the machining of workpieces, particularly for single-spindle machine tools, for storing tools and for removing and returning the tools by means of a changing device or changer.

Tool racks of the foregoing type have a fixed, bottom-secured, vertical column, which carries a cylindrical, rotatably mounted rotor and which is equipped with a mounting means for the positive reception of the tools.

Tool racks are used in many machine tools, particularly for the machines with numerical control for machining of workpieces, especially in machining centers. Numerous different constructions of tool racks are known. One known basic construction of a tool rack is a disk-shaped plate magazine, on the circumference of which are arranged the tools, generally together with a tool holder. The tools are positioned in a drum-like or radial manner. In this radial arrangement of the tools, an increase in the number of storage locations can be obtained in that several such plate magazines can be arranged in layers one on top of another, as disclosed, for example, in German Patent No. 1,912,369. In this conventional rack, tools are mounted in axially displaceable blocks, with the aid of which the tools can be moved into a tool transfer position, where they can be removed from or returned to the magazine by the tool exchanger. However, relatively high expenditure for the displaceable mounting of the blocks and the displacement mechanism are disadvantageous.

Admittedly such expenditure can be reduced in that the tools can be arranged axially in several stages on a rotating drum and their longitudinal axis can be located tangentially to a circular path concentric to the cylinder, so that they can be removed and inserted by a gripping device. However, it is disadvantageous that only a relatively small number of tools can be arranged on the drum circumference, cf. Swiss Patent No. 556,712.

Another tool rack construction known is a chain magazine, in which tools are mounted parallel to each other or at right angles to the rotation axes of a rotating chain drive. However, if the number of tool locations in such a magazine is not adequate, it is necessary to set up a further magazine or magazines on the machine tool. A relatively large space requirement and relatively large expenditure for the control of the removal and return of the tools are, however, disadvantageous.

In addition, so-called flat racks are known, in which the tools are arranged on a planar, generally vertical surface and are removed from and returned to that surface by a portal loader. Thus, a large tool storage capacity can be achieved, and in addition each tool can be relatively rapidly reached by means of the portal loader, without it being necessary to move the entire tool mass, such as is e.g. the case with the plate or chain magazine. However, a disadvantage of the flat rack resides in the very large space requirement because, apart from its own space surface, each tool requires additional, unused access surfaces for the portal loader, so that the latter must move over considerable distances.

In another known construction of a tool rack of the present applicant (Swiss Patent Application No. 4344/86-BE 21 189), a cylindrical, rotatably mounted rotor is used, which is provided at its ends with circular running paths for receiving tool magazines provided with running gears, circumferentially displaceable relative to the motor and abutting against one another and which, accompanied by the formation of a magazine-free sector, are arranged for the loading and unloading of the rotor with tools and for the access of a handling means, e.g. a tool exchange loader. This construction ensures that the locations for the individual tools can be closely juxtaposed, but the magazine-free section is not available for occupancy by tools. Although this rack can be used for both single-spindle and multiple-spindle machine tools, its operation is directed more particularly at the latter.

SUMMARY OF THE INVENTION

It is an object of the present invention to provide an improved tool rack including a cylindrical, rotatably mounted rotor for receiving the tools, and which rack is more particularly intended for a single-spindle machine tool. The function of the tool rack is to make available tools in a large number, in a sufficiently short time and with accurate positioning and to permit the interchanging of tools by an interchanger in a spindle or tool reception station of the machine tool.

The objects of the invention are attained by the tool rack in which the tools are mounted with gapfree density on the entire circumference of the mounting device of the rotor without direct gripping possibility for the interchanger device for the removal and return of the tools, whereby displacement means associated with the tool rack for moving the tool or individual tools are displaced radially beyond the length of the tools stored in the rotor. Thus, the tools can be brought into a position, where they are accessible for gripping by the tool exchanger.

The aforementioned objects, features and advantages of the invention will, in part, become obvious from the following more detailed description of the invention, taken in conjunction with the accompanying drawing, which form an integral part thereof.

DETAILED DESCRIPTION OF THE PREFERRED EMBODIMENTS

Figure 1:
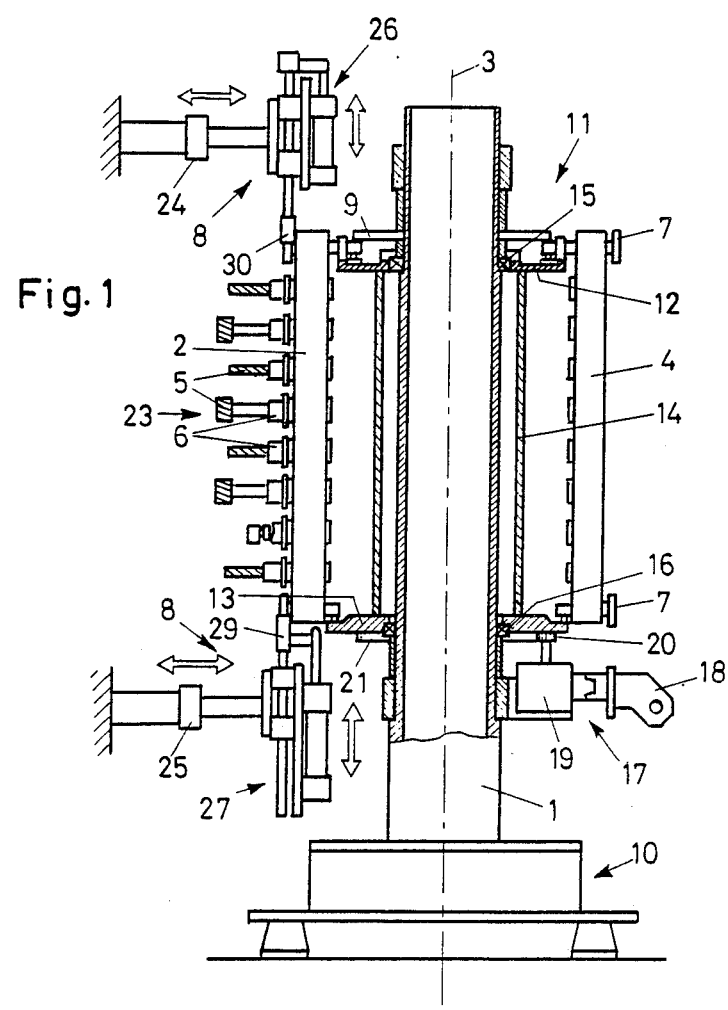
FIG. 1 is a diagrammatically represented vertical section of a tool rack with a rotor for receiving tool magazines.

Except for its rotor, a tool rack for receiving tools according to FIG. 1 is constructed in a similar manner to that of the last-mentioned Swiss patent of the present applicant. This tool rack has a central cylindrical column 1, which is mounted on a foundation 10. Foundation 10 can be constructed as a base or a structure integrated into the machine tool bed. The column 1 can be connected positively to the foundation 10, e.g. by welding or pinning, or nonpositively, e.g. by jamming. In the latter case the advantage is obtained of a stepless, radial adjustment of the complete tool rack to the circumference of the machine periphery. Column 1 supports a cylindrical rotor 11, which comprises two rotary supports 12, 13 spaced from each other along the axis of column 1, and a coaxial sleeve 14 connecting the supports 12 and 13 to each other and rotatably mounted on column 1 by means of bearings 15, 16. Tool magazines 2 extending axially and parallel to the axis 3 of column 1 are arranged in a ring-like manner on the periphery of the circular supports 12, 13. A clamping plate 9 is used for the positional fixing of the tool magazines 2 and also releases the latter if they have to be moved, as will be explained hereinafter. The tool magazines 2 have a plurality of juxtaposed tool seats or receptacles 4, in which it is possible to radially mount tools 5, which are generally assembled with tool holders 6. At the ends of the tool magazines 5 are arranged gripper plates 7, which can also be used for coding purposes.

Figure 2:
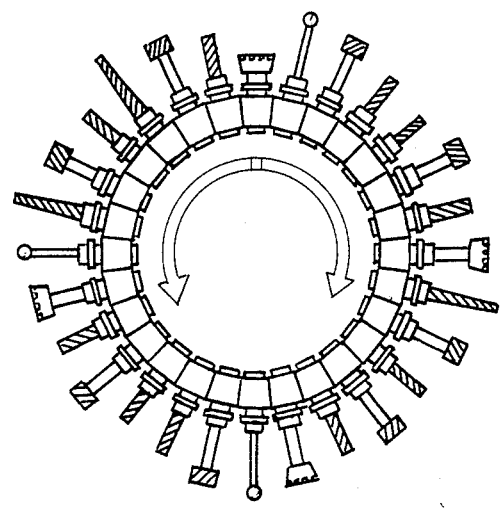
FIG. 2 is a diagrammatically represented horizontal section of the tool rack according to FIG. 1.

FIG. 2 shows that the entire circumference of rotor 11 has tool magazines 5 with uninterrupted or densed packing, the later being so dense or tight that it is not possible for a tool exchanger to have access to a tool. This dense and uninterrupted arrangement of the tools leads to a considerable increase in the storage capacity as compared to the aforementioned earlier dated patent of the present applicant, in which the tool rack has gaps not occupied by tools. By filling the gaps with further tools, the storage capacity is increased by 15% to 25%.

As this dense, uninterrupted arrangement of the tool magazines 2 and tools 5 does not permit a direct access to any tool, each tool magazine with a desired tool may be linearly radially advanced. FIG. 1 shows that the rotor 11 is driven by a motor drive 17, including e.g. a hydraulic motor 18, a reduction gear 19 and a driving pinion 20 meshing with a rack 21 arranged coaxially to axis 3 of column 1 and fixed to the lower support 13. Drive 17 can be rotated clockwise and counterclockwise, as well as being both steplessly and stepwise adjustable. By drive 17 the desired tool is pivoted with its magazine 2 into the area of a magazine gripper device 8, which comprises two lifting units 26, 27, arranged opposite each other in the longitudinal direction of the magazine and constituted, for example, by pneumatic or hydraulic cylinders and which are supported on displacement arms 24, 25, e.g. hydraulic or pneumatic cylinders of a displacement unit 23. The displacement arms 24, 25 can be supported at appropriate locations on the non-shown machine tool frame, without impeding access to the tool magazine.

At the end of each of the lifting units 26, 27 is provided a gripper 29, 30, with the aid of which it is possible to grip a particular tool magazine 2 which has been supplied, and after releasing the clamping plate 9, a radial advance is made possible. It may optionally be necessary to raise the tool magazine 2 some distance, before it can be radially advanced over the length of the tools of the adjacent tool magazines 2.

Figure 3:
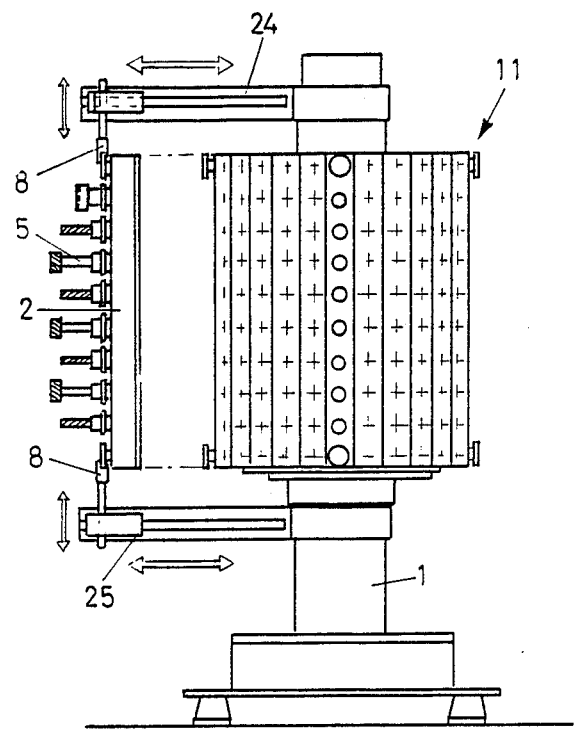
FIG. 3 is a diagrammatically represented side view of the tool rack of FIG. 1 with a cassette advanced out of the rotor.
Figure 4:
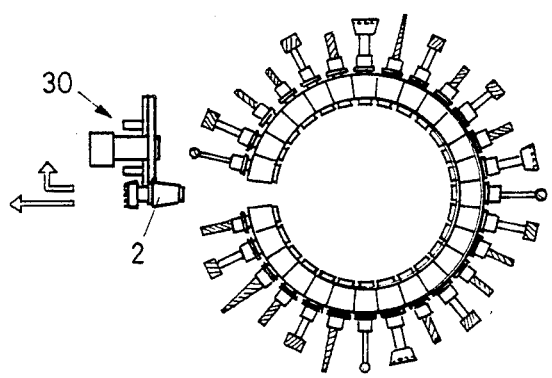
FIG. 4 is a diagrammatically represented horizontal section of the tool rack of FIG. 1 with a tool exchanger for gripping a tool from an advanced cassette.

In FIG. 3, the displacement arms 24, 25 of displacement unit 23 are fixed to the tool rack column 1. Here again the displacement arms 24, 25 displace the tool magazine 2 with the desired tool to such an extent that the tool can be gripped by the gripper or tool interchanger as shown in FIG. 4.

Access to a tool in the tool rack is obtained in the following way. The magazine gripper devices 8 are open. The rotor 11 with the tool magazine 2 fixed thereto is rotated until a desired magazine 2 is positioned upstream of gripper devices 8. As a function of a distance from the sought magazine, the rotary movement is performed either clockwise or counterclockwise, so that a rapid display of the magazine is achieved. The so-positioned magazine 2 is gripped, optionally raised and linearly advanced. At the transfer point the tool interchanger 30 can remove the desired tool from the magazine. The tool interchanger 30 is designed in such a way that it can move up to the entire vertical area of the magazine.

The tool interchanger 30 transports the tool to a work spindle of the machine tool, where the tools are exchanged. The used tool is transported by the tool interchanger 30 to the advanced magazine 2. In the meantime a new magazine 2 has been positioned at the transfer point by the tool rack. The new tool is removed from the magazine by location interchange i.e. used tool/new tool. This cycle is repeated whenever a new tool is required.

As a result of the fixed arrangement of the magazines 2 on the circumference of rotor 11, the rotary movement can be carried out at high speed. The positioning of the sought magazine 2 at the transfer point takes place through a position sensor, e.g. an incremental sensor. In the case of a tool rack for a single-spindle working machine with very short working operations, it is advantageous to operate with "flying position occupancy". Although this increases the software expenditure for the control and tool administration, it assists the time optimization for tool display. "Fixed position occupancy" is naturally also possible if longer display times and additional movements can be accepted.

The same considerations as defined in the earlier-dated mentioned applicant's patent apply to the automatic handling of the magazine 2, i.e. the tool preparation system, the manual changing of tools outside the working scope of the rack and the loading and unloading of the transportation units can also be used here.

Figure 5:
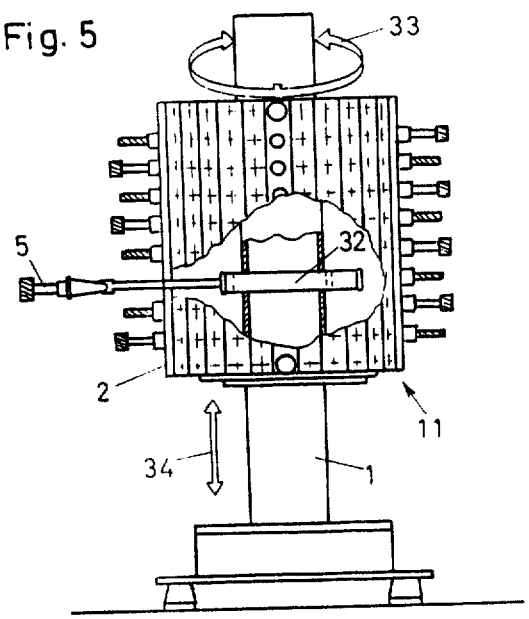
FIG. 5 is a side view of the tool rack as in FIG. 3 with a displacement unit for advancing a tool arranged in the interior of the rotor and which in the advanced position permits the gripping with a tool exchange loader.

In various uses it is desirable to make available a single tool and not an entire magazine 2 and the rack construction according to FIG. 5 is suitable for this. In FIG. 5 a displacement unit 32 is mounted within the rotor 11. The displacement unit 32 is provided with a gripper, which is mounted on the tool rack column 1. Displacement unit 32 moves a tool 5 out of magazine 2 at the transfer point. The displacement unit 32 can be constructed as a pneumatic or hydraulic piston-cylinder unit with a corresponding control.

The displacement unit 32 can be displaceably mounted on column 1, so that it can move each tool of a magazine into the transfer position. In FIG. 5 the displacement 32 is arranged in a fixed manner on column 1, whilst rotor 11 is rotatable in two opposite directions and is also displaceable on the column, cf. the double arrows 33, 34 for the rotary movement in both directions and for the axial movement for adjusting the height of rotor 11. It is therefore possible for the tool interchanger to take a single tool from a plurality of tools and transfer it to a single, defined position. After providing a single tool at the transfer point, tool changing takes place in the same way as described hereinbefore. Instead of advancing a tool magazine 2, in this case a single tool is gripped from the rear by the displacement unit 32 and advanced to the transfer point.

The tool magazines 2, which are densely and uninterruptedly arranged on the circumference of the rotary table, can be replaced by a closed casing 22 on rotor 11, which has mounting supports for receiving tools 5. Thus, it is possible to retain all the aforementioned advantages of the tool rack, such as a high storage quantity, rapid tool access, etc., without however having the advantage of loading and unloading the complete tool magazine. The closed casing can be appropriately used where loading and unloading of the magazines is unnecessary. Such uses are e.g. tools with a long life, tools for aluminum working and for tool racks, in which only single tools have to be replaced. The advance of the single tools to the transfer point takes place through the internal displacement unit 32, and appropriately rotor 11 is moved in accordance with the double arrows 33, 34 of FIG. 6.

Figure 7:
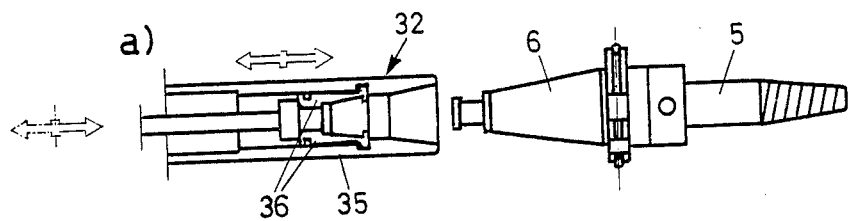
FIG. 7 is a diagrammatic representation of the clamping process of a tool in the displacement unit according to FIG. 5.
Figure 7:
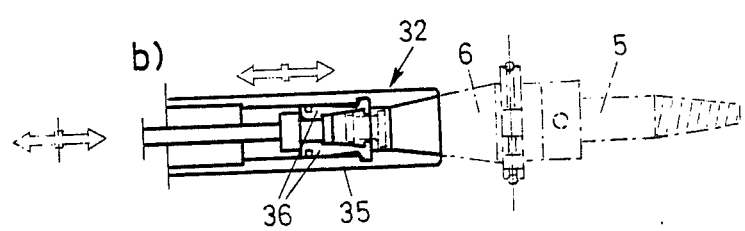
Figure 7:
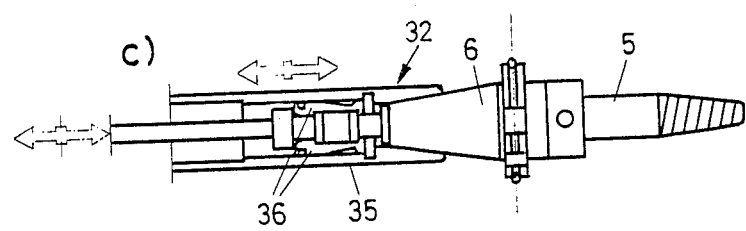
Figure 7:
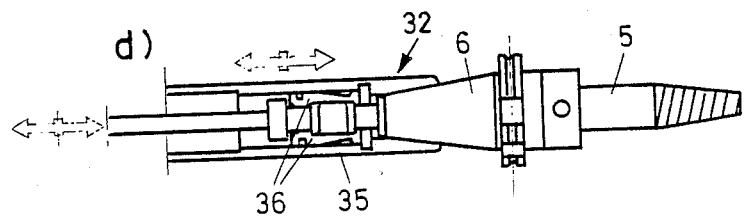

FIG. 7 shows the construction of the gripper of the internally mounted displacement unit 32 in four operation phases (a) to (d). The displacement unit 32 has at its free end a gripping head 35 with gripping jaws 36, which can be moved forwards for taking over a tool 5 with a tool holder 6. In phase (b) the tool 5 is inserted into the gripping head 35 and in phase (c) the tool is secured in head 35 by the gripping jaws 36. In phase (d) the secured tool 5 can be advanced by the displacement unit 32 and at the transfer point the tool is taken over by the tool interchanger 30.

Figure 8:
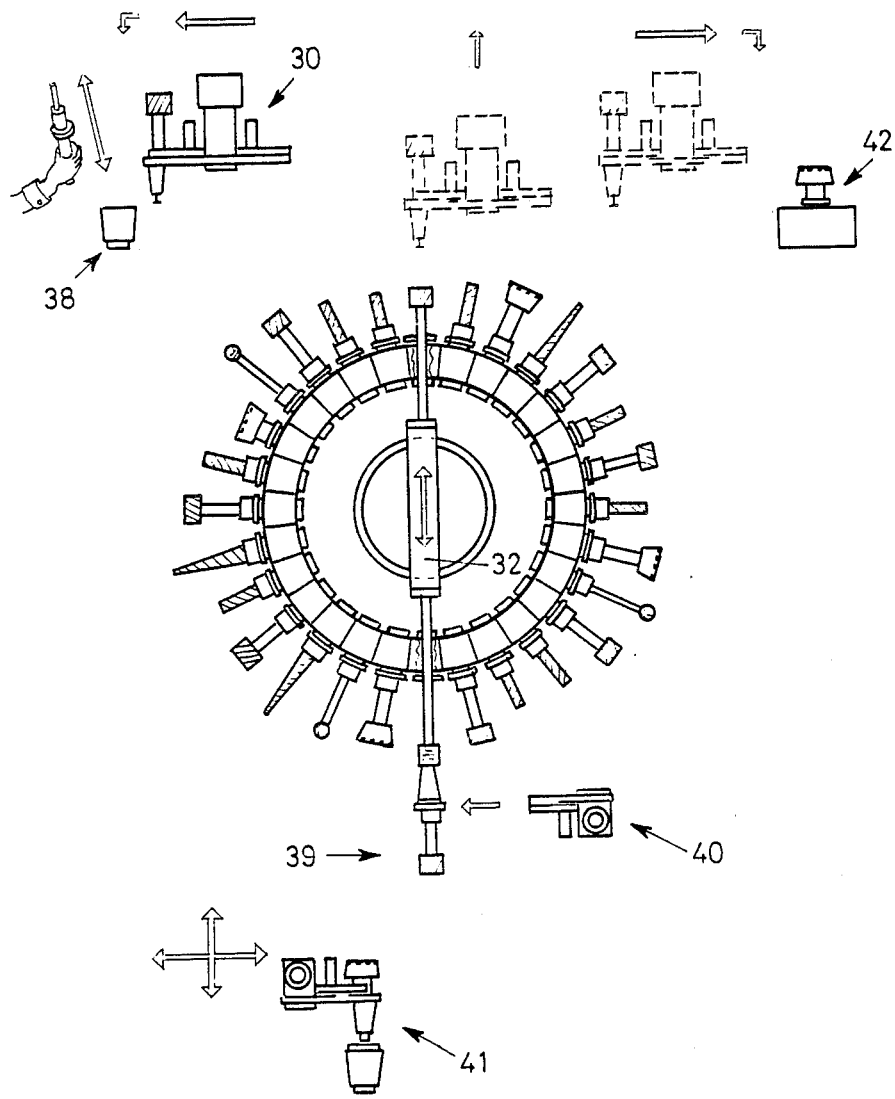
FIG. 8 schematically shows different possibilities for the loading and unloading of individual tools in conjunction with the tool rack of the invention.

FIG. 8 shows the possibilities for the loading and unloading of single tools. The individual tools can be loaded and unloaded with the same tool interchanger 30 which serves the machine spindles, cf. the arrangement in the upper part of FIG. 8. The tools are collected at a transfer section 38 either singly or multiply, e.g. in a magazine. This transfer station 38 is also accessible to operating personnel, which makes it possible to manually operate the tool magazine.

In another arrangement the individual tools can be advanced to a predetermined location by a second displacement unit 32, and different respective angles can be chosen, for example, angle 180° being used as shown in FIG. 8. At this transfer station 38, the single tools can be taken over by a portal loader-interchanger 40 and transported from there to a central, not shown tool issuing station. This arrangement also permits a chained tool exchange between two or more individual machine tools. The manual tool exchange is also possible here.

The individual tools can also be advanced by the second displacement unit 32 at transfer station 39, where a stationary tool interchanger 41 takes over the tools and places same into a transportation means, e.g. into the aforementioned transportation unit. Reference numeral 42 designates the working station or the spindle.

There has been disclosed heretofore the best embodiment of the invention presently contemplated. However, it is to be understood that various changes and modifications may be made thereto without departing from the spirit of the invention.

What is claimed is:

1. A tool rack for machine tools with numerical control for machining workpieces, comprising storage means for storing tools; tool interchanger means for removing tools from and returning tools to said storage means; a fixed, bottom-secured, vertical column, said storage means including a cylindrical, rotatably mounted rotor supported on said column and provided with bearing means for a positive mounting of tools so that axes of said tools extend radially of said rotor, said tools being placed in a dense, closely adjacent, uninterrupted manner over an entire circumference of the bearing means of said rotor so that any direct access for said tool interchanger means to said tools for removing and returning of the tools will not be possible; and displacement means corresponding to said storage means and including gripping means radially displaceable to and from said bearing means and enabling at least one of said tools to be disengaged radially outwardly over and beyond the length of the tool stored in said rotor of said storage means to a transfer position in which direct access of said tool interchanger means to said at least one of said tools is no longer impeded and the tool can be gripped and removed from said storage means laterally thereof.

2. The tool rack according to claim 1, wherein said bearing means include a casing fixed to said rotor and supporting the tools in a dense, closely adjacent, uninterrupted manner.

3. The tool rack according to claim 2, wherein said tools are mounted in said casing in tool receptacles.

4. The tool rack according to claim 1, wherein said bearing means includes a casing which comprised of individual tool magazines fixed to the rotor and in which the tools are arranged in a row, the magazines being closely juxtaposed on said rotor.

5. The tool rack according to claim 1, wherein said displacement means includes a tool displacement unit mounted in an interior of said rotor and including at least one displacement arm having said radially displaceable gripping means for gripping and displacing a single tool in a radial direction over and beyond the length of the tool stored in the rotor into said transfer position.

6. The tool rack according to claim 5, wherein said displacement unit is arranged on said column and is provided with means for vertically displacing said unit along the column.

7. The tool rack according to claim 4, wherein said displacement means includes at least one magazine displacement unit including displacement arms which are positioned above and below the rotor, respectively and are provided with said gripping means having grippers for gripping a tool magazine.

8. The tool rack according to claim 7, wherein said displacement arms with said grippers are fixed to said column above and below the rotor, respectively.

9. The tool rack according to claim 1, wherein said rotor is provided with lifting device for vertically adjusting said rotor on said column, said lifting device further enabling a single tool to be moved into a fixed position suitable for access to said tool by said interchanger means.

10. The tool rack according to claim 4, wherein said displacement means includes a tool displacement unit mounted in an interior of said rotor and including at least one displacement arm provided with said radially displaceable gripping means for gripping and displacing a single tool in a radial direction over and beyond the length of the tool stored in the rotor into said transfer position.

11. The tool rack according to claim 1, utilized for single-spindle machine tools.

* * * * *

UNITED STATES PATENT AND TRADEMARK OFFICE
CERTIFICATE OF CORRECTION

PATENT NO. : 4,920,631

DATED : May 1, 1990

INVENTOR(S) : Peter Novak

Figure 6:
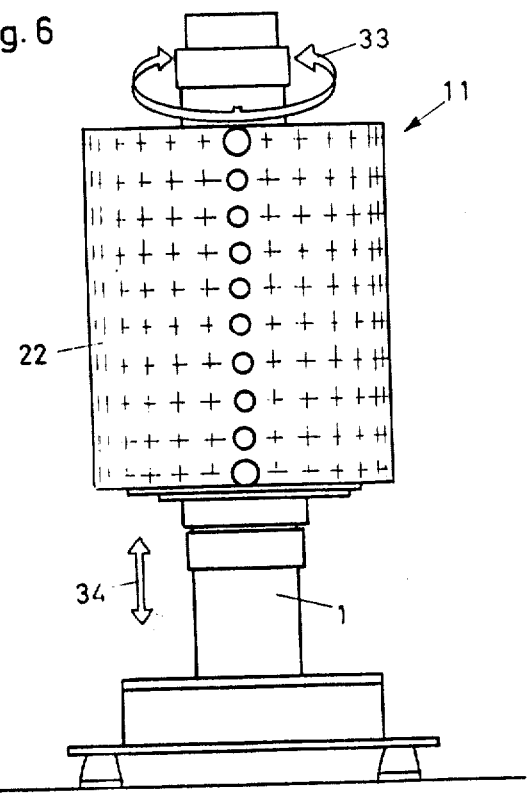
FIG. 6 is a side view of a storage unit, in which a casing is fixed to the rotor containing holders in a magazine-free arrangement for the reception of tools which are very densely packed.

It is certified that error appears in the above-identified patent and that said Letters Patent is hereby corrected as shown below:

The sheet of drawing consisting of Figs. 5 and 6, should be added as per attached page.

Signed and Sealed this

Eleventh Day of February, 1992

Attest:

HARRY F. MANBECK, JR.

*Attesting Officer*  *Commissioner of Patents and Trademarks*